United States Patent
Houghton

(10) Patent No.: US 7,207,436 B1
(45) Date of Patent: Apr. 24, 2007

(54) ANTI-STATIC ROLLER CONVEYOR

(75) Inventor: Harry E. Houghton, Orland Park, IL (US)

(73) Assignee: Automotion, Inc., Oak Lawn, IL (US)

( * ) Notice: Subject to any disclaimer, the term of this patent is extended or adjusted under 35 U.S.C. 154(b) by 0 days.

(21) Appl. No.: 11/493,210

(22) Filed: Jul. 25, 2006

(51) Int. Cl.
*B65G 21/08* (2006.01)

(52) U.S. Cl. .................................. 198/860.1; 198/831

(58) Field of Classification Search .............. 198/831, 198/860.1, 860.2, 860.3, 861.1, 781.1, 790, 198/781.09
See application file for complete search history.

(56) References Cited

U.S. PATENT DOCUMENTS

| | | | |
|---|---|---|---|
| 4,196,805 A | 4/1980 | Banno | |
| 4,681,215 A | 7/1987 | Martin | |
| 4,793,459 A | 12/1988 | Forknall et al. | |
| 4,903,820 A | 2/1990 | Fyfe | |
| 5,378,273 A * | 1/1995 | Taguchi et al. | 156/521 |
| 5,582,286 A * | 12/1996 | Kalm et al. | 198/860.3 |
| 5,645,155 A | 7/1997 | Houghton | |
| 6,003,656 A | 12/1999 | Fortenbery | |
| 6,053,298 A | 4/2000 | Nimmo et al. | |
| 6,112,875 A | 9/2000 | Gibson | |
| 6,161,673 A | 12/2000 | Nimmo et al. | |
| 6,454,077 B2 | 9/2002 | Nimmo et al. | |
| 6,516,940 B1 * | 2/2003 | Hart et al. | 198/781.1 |
| 6,702,091 B2 | 3/2004 | Nimmo et al. | |
| 2003/0168319 A1 * | 9/2003 | Hart et al. | 198/781.04 |
| 2005/0247545 A1 | 11/2005 | Ni et al. | |

* cited by examiner

*Primary Examiner*—James R. Bidwell
(74) *Attorney, Agent, or Firm*—Wood, Phillips, Katz, Clark & Mortimer

(57) ABSTRACT

A roller conveyor having motor driven rollers with electronic motor controls mounted on the conveyor side plates is subject to damage of the motor controls from arcing discharge of static electricity generated by articles traveling on the conveyor. The static electricity is dissipated by a conductive coating on the conveyor side plates and other conductive components of the conveyor.

6 Claims, 1 Drawing Sheet

ANTI-STATIC ROLLER CONVEYOR

BACKGROUND OF THE INVENTION

One type of roller conveyor is powered by DC motors located in roller cylinders which are mounted with other rollers between the conveyor side plates. Electronic motor control modules are mounted on one of the side plates. Packages traveling on the conveyor rub against the side plates and rollers generating static electricity which can arc between the side plate and control module damaging the control module components.

BRIEF DESCRIPTION OF THE INVENTION

Damage to the control module from a discharge of static electricity is prevented by dissipating the static charge. This is accomplished by a combination of features. The metal side plates of the conveyor are finished with a conductive coating rather than a non-conductive coating in which the static charge can accumulate. Where the rollers are electrically isolated from the side plates as by resilient plastic bushings, a conductive plastic is used to dissipate the static charge developed in the rollers. In a curved section of the conveyor with tapered rollers, if the tapered roller surface sleeve is plastic, a conductive plastic is used, again dissipating any charge developed in the roller.

DETAILED DESCRIPTION OF THE INVENTION

Figure 1:
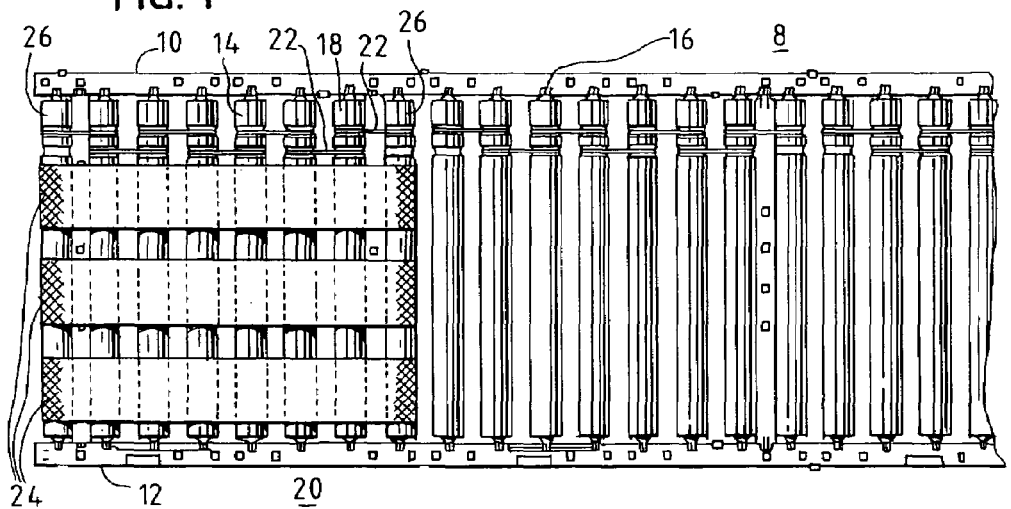
FIG. 1 is a plan view of a conveyor section.
Figure 2:
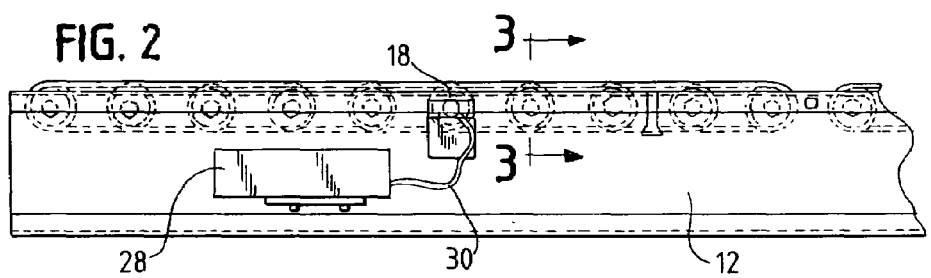
FIG. 2 is a side view of a conveyor section showing an electronic motor control module.

A roller conveyor section 8, FIGS. 1 and 2, has side plates 10 and 12 between which are mounted carrying rollers 14. The side plates are metal, typically steel. The rollers 14 are also steel and have steel axles 16 received in openings in the side plates. A conveyor which is powered by motor-driven rollers (MDR) has a roller with a 24-volt DC motor inside the roller cylinder, typically at 24 inch increments along the length of the conveyor. In FIGS. 1 and 2, motorized roller 18 drives the rollers 14 of a conveyor zone 20 through O-ring like drive connections 22. Conveyor belts 24 may be provided around terminal rollers 26 of the zone 20 and across carrying rollers 14, to provide better traction for moving articles and to prevent small articles from falling between the rollers.

The motor in roller 18 is controlled by an electronic module 28 mounted on side plate 12 and connected with the motor through cable 30. The electronic control module comprises electronic components, including a control card, which are subject to damage by a discharge of static electricity.

Figure 3:
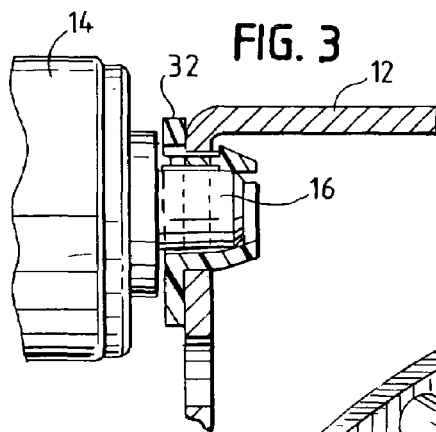
FIG. 3 is an enlarged view along line 3—3 of FIG. 2, showing a roller axle received in a plastic bushing.

In accordance with the invention, the side plates 10, 12 are finished with a conductive coating as a powder coating or paint. Static electricity developed in the rollers and side plates is readily dissipated by conduction through the coating. A static charge does not accumulate and the static discharge which might damage the control module 28 does not occur. Conveyor belts 24, where used, are also conductive to inhibit charge accumulation The roller axles 16 are preferably isolated from the side plates to reduce noise and vibration, as by a plastic bushing 32, FIG. 3, as taught in Houghton U.S. Pat. No. 5,645,155. Static electricity developed in the roller is dissipated to the side plate by a bushing 32 of conductive plastic.

Figure 4:
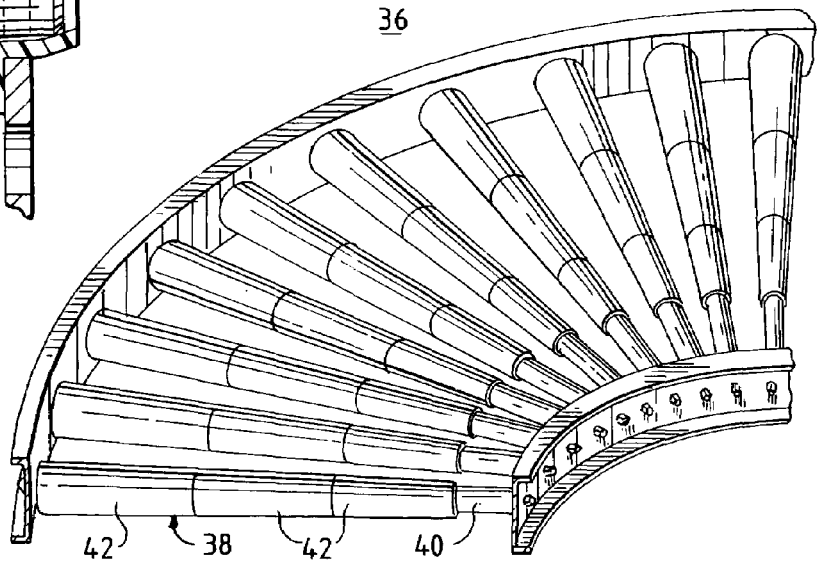
FIG. 4 is a perspective view of a curved section of the conveyor with tapered plastic sleeves on the rollers.

In a curved conveyor section 36 shown in FIG. 4, rollers 38 have a tapered surface to move conveyed articles around the curve. As described more fully in Houghton provisional application 60/698,822 filed Jul. 13, 2005 and continuation application 11/484,392 filed Jul. 11, 2006, the tapered rollers have a cylindrical metal core 40 with a tapered surface provided by plastic sleeves 42. A conductive plastic is used to dissipate the static charge developed in the sleeves.

The combination of a conductive coating on the side plates, the conductive plastic axle bushings 32, conductive plastic tapered sleeves 42 and conductive conveyor belts 24, if belts are used, provide a conveyor in which static charge cannot accumulate to arc with the motor control module 28.

What is claimed is:

1. In a roller conveyor having a frame comprised of two laterally spaced metal side plates, metal rollers with metal axles received in aligned openings in each side plate, at least one of the rollers having a motor therein for driving the conveyor, and an electronic motor control module mounted on one of said side plates and electrically connected to the motor, the conveyor being subject to the build-up of static electricity on the rollers and side plates as a result of friction between articles being conveyed and components of the conveyor, which static electricity may arc to and damage said motor control module, the improvement comprising:

a conductive coating on said side plates to dissipate static electricity, protecting said electronic motor control module.

2. The improved roller conveyor of claim 1 further comprising conductive plastic bushings mounted in the openings of said metal side plates to receive the axles of said rollers.

3. The improved roller conveyor of claim 1 in which said conveyor includes a curved section and rollers in said curved section have a cylindrical core with a tapered sleeve of conductive plastic.

4. The improved roller conveyor of claim 1 further comprising a conveyor belt of conductive material extending around the rollers.

5. The improved roller conveyor of claim 1 in which the conductive coating on the side plates is a paint.

6. The improved roller conveyor of claim 1 in which the conducting coating on the side plates is a powder coating.

* * * * *